(12) United States Patent
Gray

(10) Patent No.: US 8,008,792 B2
(45) Date of Patent: Aug. 30, 2011

(54) ENERGY TRANSFORMATION DEVICE

(75) Inventor: Dennis John Gray, Spring, TX (US)

(73) Assignee: Dennis Gray, Spring, TX (US)

( * ) Notice: Subject to any disclaimer, the term of this patent is extended or adjusted under 35 U.S.C. 154(b) by 901 days.

(21) Appl. No.: 11/852,145

(22) Filed: Sep. 7, 2007

(65) Prior Publication Data

US 2009/0066085 A1 Mar. 12, 2009

(51) Int. Cl.
*F03B 13/10* (2006.01)
*F03B 13/12* (2006.01)
*H02P 9/04* (2006.01)

(52) U.S. Cl. .......................................... 290/42; 290/53
(58) Field of Classification Search .................... 290/42, 290/53; 60/495, 496, 497, 498, 501, 505, 60/507; 416/85

See application file for complete search history.

(56) References Cited

U.S. PATENT DOCUMENTS

| | | | | |
|---|---|---|---|---|
| 628,457 A * | 7/1899 | Gehre | | 290/42 |
| 3,567,953 A * | 3/1971 | Lord | | 290/42 |
| 4,034,565 A * | 7/1977 | McVeigh | | 60/503 |
| 4,077,213 A | 3/1978 | Hagen | | |
| 4,145,885 A * | 3/1979 | Solell | | 60/504 |
| 4,207,739 A * | 6/1980 | Scarpi | | 60/398 |
| 4,241,579 A * | 12/1980 | Borgren | | 60/504 |
| 4,319,454 A * | 3/1982 | Lucia | | 60/506 |
| 4,389,843 A * | 6/1983 | Lamberti | | 60/507 |
| 5,359,229 A * | 10/1994 | Youngblood | | 290/53 |
| 5,424,582 A * | 6/1995 | Trepl et al. | | 290/53 |
| 5,710,464 A * | 1/1998 | Kao et al. | | 290/53 |
| 6,469,641 B1 * | 10/2002 | Lash et al. | | 340/984 |
| 2002/0158472 A1 * | 10/2002 | Robson | | 290/43 |
| 2003/0091393 A1 | 5/2003 | Flory | | |
| 2006/0208494 A1 * | 9/2006 | Cook | | 290/53 |
| 2006/0273594 A1 * | 12/2006 | Gehring | | 290/42 |
| 2008/0018114 A1 * | 1/2008 | Weldon | | 290/53 |

FOREIGN PATENT DOCUMENTS

GB WO 01/06119 B1 7/2007

* cited by examiner

*Primary Examiner* — Julio Gonzalez

(57) ABSTRACT

This invention is a device for transforming the energy of water waves into useable energy. The device comprises two or more floats, structural members connecting the floats, a means for transferring torque, and one or more generators.

11 Claims, 4 Drawing Sheets

ENERGY TRANSFORMATION DEVICE

CROSS-REFERENCES TO MOST RELATED APPLICATIONS

| U.S. Pat. Nos. | Title |
| --- | --- |
| 7,199,481 | Wave energy conversion system |
| 6,857,266 | Wave energy converter |
| 6,812,588 | Wave energy converter |
| 6,772,592 | Float dependent wave energy device |
| 6,791,205 | Reciprocating generator wave power buoy |
| 6,765,307 | Wave energy converter (WEC) |
| 6,392,314 | Wave energy converter |
| 6,226,989 | Wave energy converter |
| 5,027,000 | Method and apparatus for generating electricity using wave energy |
| 4,412,417 | Wave energy converter |
| 4,359,868 | Ocean wave energy converter |
| 4,345,434 | Sea and ocean wave energy converter |
| 4,258,269 | Wave power generator |
| 4,077,213 | Wave driven generator |
| 20030091393 | Wave power machine |
| 4,078,871 | Sea wave energy conversion |

STATEMENT REGARDING FEDERALLY SPONSORED RESEARCH & DEVELOPMENT

Not Applicable. No others have rights to this patent. Dennis Gray is the sole inventor and the invention was not created under any federally sponsored programs.

BACKGROUND OF THE INVENTION

Populations grow exponentially, world economies are expanding, demand for energy is escalating, and fossil fuels are running out. Political tensions regarding hydrocarbons are increasing to say the least. Greenhouse effects and global warming trends have become more evident. In light of these issues the U.S. Department of Energy has placed Renewable Energies as a focal point to their programs.

When one looks across an open ocean and views the large rolling waves the energy is glaringly obvious. However, when one thinks of how that energy could be extracted they are immediately discouraged by the randomness of wave heights, randomness of wavelengths, and randomness of wave frequencies. Water is 800 times as dense as air and carries far more energy. Winds travel for hundreds of miles and beautifully store and compact their energy into waves. The magnitude of energy in ocean waves is fairly easy to comprehend. The difficult part is envisioning how organized and consistent energy can be extracted from what appears to be chaos. The invention herein solves this greatest challenge and more.

To be cost effective and viable, a wave energy transformation device must be strong and robust to survive punishing ocean environments. To be reliable it must be simple in design, avoid sophisticated components, and have any critical components protected from the harsh oceanic environment. Simplicity in design also ensures low capital investment, low operating costs, and low maintenance costs. An energy transformation device should also demonstrate mass interconnectivity and not require individual mooring systems. Ideally, these devices should float and either be capable of withstanding storm events or be towed away when the largest of storms arise.

Upon review of similar patents one will find that most have addressed only a few of the challenging design requirements mentioned above. Without addressing all of them an energy transformation device cannot produce power cost effectively. The novel invention presented herein overcomes all of the above challenges. Particular features not found in prior inventions make this invention considerably more viable.

BRIEF SUMMARY OF THE INVENTION

The purpose of this invention is to efficiently and cost effectively transform water wave energy into useful electrical energy with little or no environmental impact. There are numerous advantages of this particular invention in comparison to others conceived before.

The novelty and effectiveness of this invention is primarily due to many beneficial features. First, maximum available wave power, not partial available power, is extracted and it is extracted on both up and down strokes. Torque arms, acting as levers, multiply the power output. Flywheel gearing ensures power is produced constantly, not intermittently, regardless of ocean waves being sinusoidal and random in nature. The randomness of waves becomes therefore irrelevant. The design is strikingly simple ensuring capital costs are very low and reliability is extremely high. Critical components are 100% protected from oceanic spray keeping maintenance costs negligible. Hundreds of units can be interconnected together without a need for individual, and costly, mooring systems. Unlike offshore wind turbines, where huge permanent structures are driven well into the seabed, hundreds of units simply float and can be interconnected. Many units interconnected is considered an "array". Mooring of an array can consist of just four wire ropes and anchors at the corners. At approximately yearly intervals, arrays can be towed to shoreside facilities for maintenance. Costly offshore work is therefore eliminated. Units can be spaced close to one another, unlike offshore wind turbines, which concentrates the energy output for a given area occupied. Also unlike wind turbines they are invisible on the horizon at just a few miles out. Finally, with 70% of the world covered by oceans "site availability" is not an issue.

A novel system for interconnecting energy transformation devices is included herein that utilizes a unique combination of rigid members, flexible members, and pivoting components. This system makes the interconnectivity possible, eliminates the need for individual mooring systems, and allows hundreds of units to be towed via a single tugboat. Towing of many units is desirable since production-line maintenance onshore is far less expensive than offshore maintenance. It also permits the initial installation of many units to be performed in a single step which greatly reduces overall capital investment costs. Finally, with many units connected together it becomes viable to install thrusters and a global positioning system vs. cables and anchors. If thrusters and a global positioning system are utilized then arrays can self-propel themselves around oncoming hurricanes or typhoons.

Critical Impact of this Particular Invention

1. In comparison with wind energy, this invention uses inexpensive steel buoys and torque arms instead of expensive wind turbine blades made from exotic lightweight materials. Although the device essentially has the same gearbox and generator, it eliminates 40%+ of a wind turbine's remaining costs (no tower structure, no tower foundation, no yaw drives, no real estate costs, etc.)

2. Waves are known to be more powerful than wind (higher energy density).
3. Waves are more consistent and reliable than wind (higher utilization factor).
4. With the novel system for interconnectivity, devices can be mass installed and maintenance can be performed in assembly-line fashion (both are physically impossible with wind turbines).

Given the multiple reasons listed above, not just one, this device and interconnect system can logically deliver energy at lower costs than wind energy (5 cents/kwh) and far less than solar energy (20 cents/kwh).

DESCRIPTION OF THE PREFERRED EMBODIMENT

Figure 1:
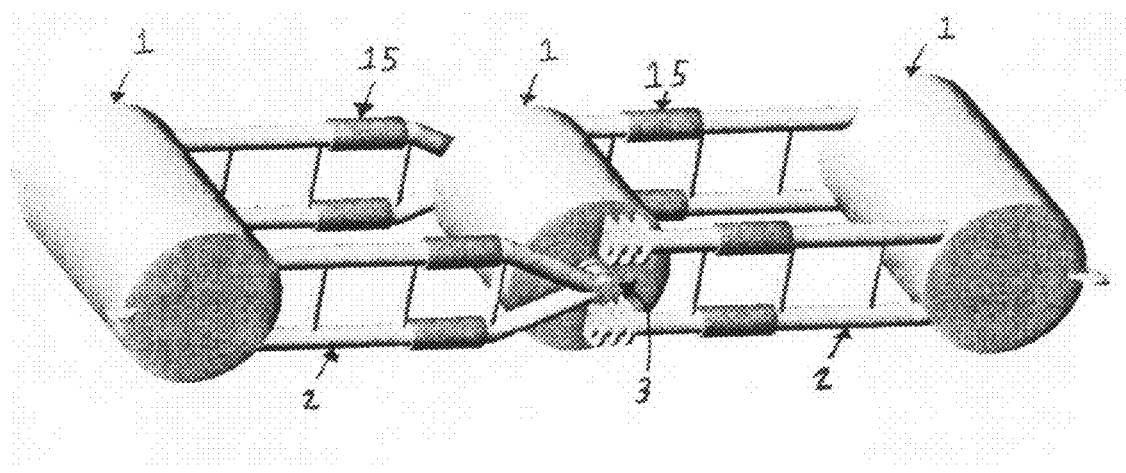
FIG. 1 is an isometric view of a preferred embodiment of the invention.
Figure 2:
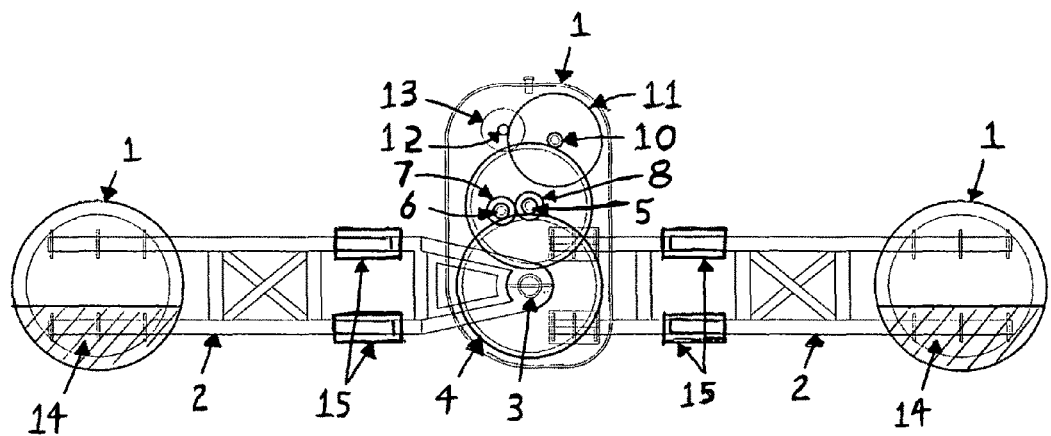
FIG. 2 is a sectional view of a preferred embodiment to better display internal components.
Figure 3:
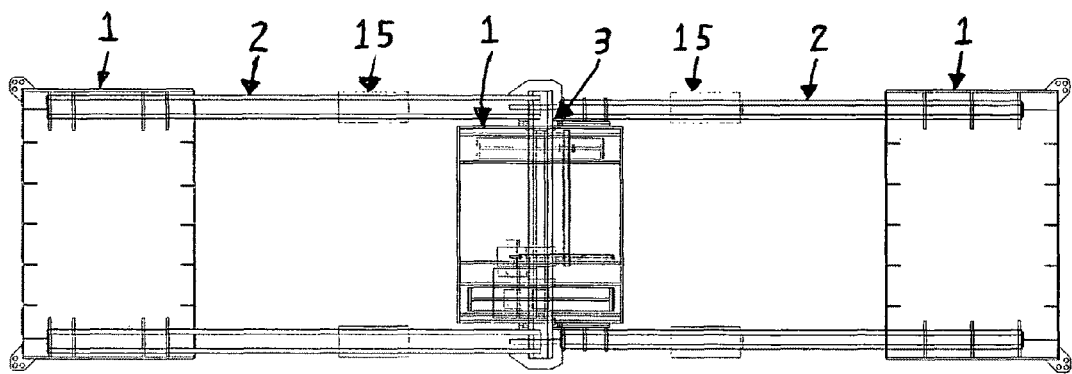
FIG. 3 is a plan view of a preferred embodiment.
Figure 4:
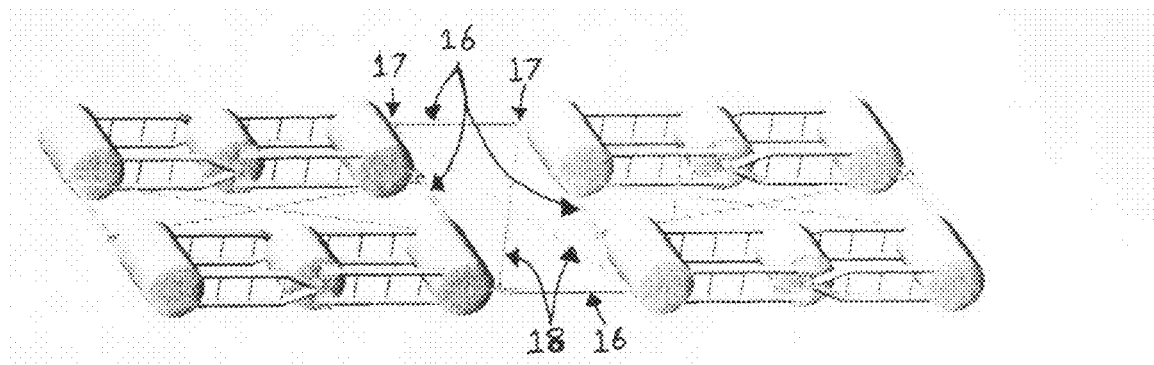
FIG. 4 is an isometric view showing several of the devices connected together.
Figure 5:
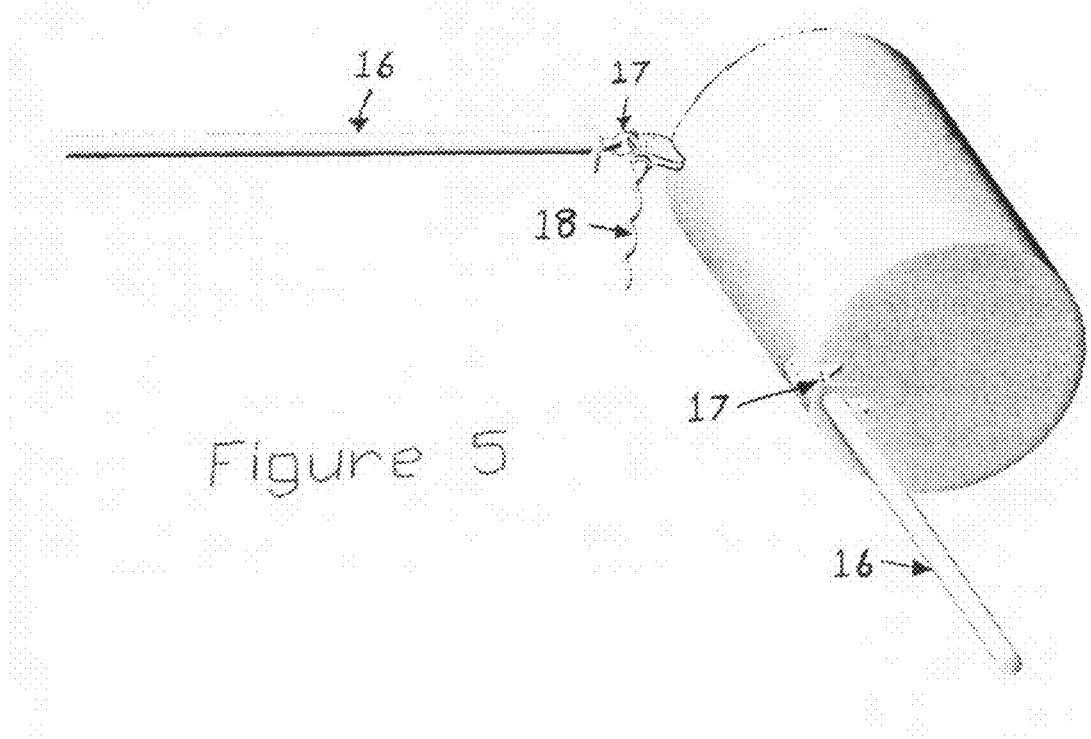
FIG. 5 is an isometric view providing a zoom of interconnection components.
Figure 6:
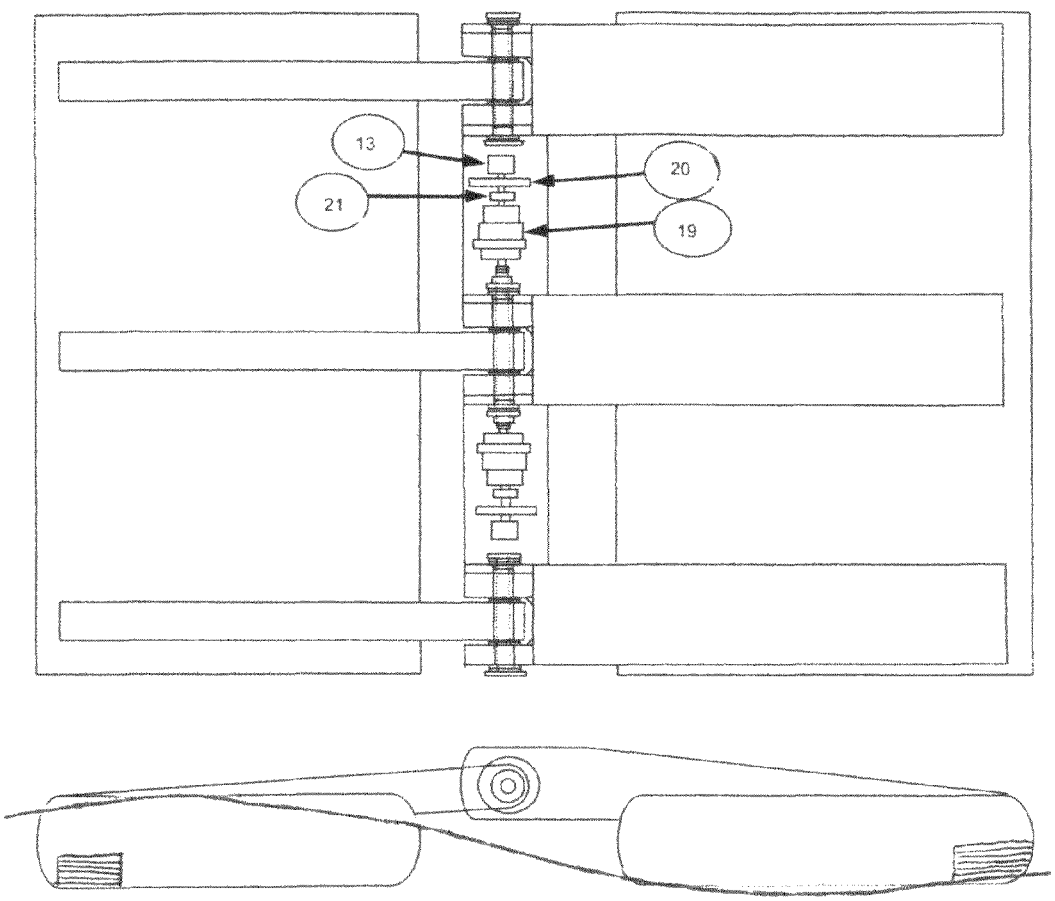
FIG. 6 is a plan and elevation view showing a desirable flywheel location

The figures illustrate a preferred embodiment of this invention. The invention can be designed and scaled for any size waves. A preferred embodiment would primarily be constructed of steel or other suitable marine materials. Components of the device include two or more floats (1) connected by torque arms (2) that pivot relative to one another around a central bushing or bearing (3). The float movements generate torque which rotates gears (4), (5), (6), (7), (8), (9), (10), (11), and (12) which in turns drives a generator (13) at higher speeds for electrical output.

Note that the height of this invention is unnecessarily tall in this illustration due to the vertical stacking of gears. This was done only to better illustrate gearing concepts. Actual gears in energy transformation devices will likely be more efficiently arranged to shorten the invention's height. Reduced height results in reduced visibility from shore. Painting energy transformation devices ocean blue in color makes them virtually invisible on the horizon. As a result, energy transformation devices can be far less of an eyesore than offshore wind turbines.

Although it is desirable that energy transformation devices be relatively invisible on the horizon, corners/edges of energy transformation device arrays (hundreds of units linked together) will likely be marked with traditional lighted buoys. This will ensure that they are visible from ships at night and in fog.

All critical components are enclosed and protected since the floats (1) themselves function as protective shells. The only exposed moving joints are the watertight bushings/bearings (3) that are properly designed for submersion in salt water. Common propeller shafts of ships have very similar watertight bearings. If desired, and since the torque arms do not rotate in excessive angles, a sleeve can be installed to cover any bearings (3) from salt water contact.

In this embodiment the floats (1) are somewhat cylindrical in shape but in other embodiments the floats could be a wide range of volumetric shapes. Floats are deliberately weighted in this embodiment such that they float at about mid level. Weights (14) could be made of concrete, other solid materials, or liquid materials. Buoyancy provides an upward force while weight provides a downward force, both of which generate useful torque. As a result, both upward and downward float motions generate torque which ultimately drives generators (3). Note that in this embodiment only one generator (13) is used but it is possible to install multiple generators. Without weights (14) the resistance of generators (13) and gears would likely cause floats to "stick" in an upward position upon the first wave crest.

As mentioned previously, floats are connected via torque arms (2). Torque arms may have the capability of automatically extending or retracting themselves via auto-lengthening mechanisms (16). Auto-lengthening mechanisms will accommodate varying wavelengths as sea conditions changed on any given day. Arm length adjustability increases energy production since distances between outer floats can better match wavelengths for optimized power output. In a preferred embodiment, one energy transformation device within a large array could measure wave heights and wave periods. A computer program could then estimate average wavelengths from the recorded data and instruct all torque arms within that array to lengthen or shorten accordingly. In the preferred embodiment, the auto-lengthening mechanisms (15) are actuated electromechanically but they could also be actuated via hydraulics or other means. Auto-lengthening mechanisms (15), like the primary bearings (3), can be protected from saltwater contact by waterproof sleeves.

With wave movements the motion of one float relative to the other float or floats creates extremely high torque. Very high torque is a result of the large displacement of a float coupled with the long torque arm lengths. The very high torque is next directly transferred via the torque arms (2) to a primary shaft which rotates a bull gear (4). The bull gear rotates gears in a gearbox (19), and the gears in the preferred embodiment are designed to perform as flywheels (20), which efficiently transfer the mechanical energy and store momentum between wave strokes. The bull gear rocks back and forth sending a tremendous amount of force in each rotational direction but at relatively slow speed. This very high torque at low speed is eventually converted via the gears to lower torque at high speed. Once at higher speed an output shaft spins an electric generator (13). Note that gears, chains and sprockets, or other means can serve to transfer torque to one or more generators.

When the bull gear rocks forward a smaller gear (5) and shaft is driven. The smaller gear's shaft system, by design in this embodiment, is driven forward but capable of free spinning backward via "clutch" (21) or "ratchet" when the bull gear eventually rotates backward. This feature is much like that applied in bicycles where pedals can be driven forward but free spin backward. However, unlike a bicycle, when the bull gear rocks back the force/energy is not wasted. Upon backward rotation the bull gear drives a different smaller gear (6) with free spinning shaft, which in turn drives another gear (7), which returns the force to an output gear (8) in the desired forward direction. This type of gearing system ensures that regardless of up or down float movement the gears (5) and (8) ultimately drive the same output shaft in a single direction. Furthermore, once the output shaft is spun in one direction the remaining downstream gears (9), (10), (11), and (12) as well as the generator (13) can maintain flywheel momentum for constant electrical output between wave cycles. Momentum, or storing of the wave energy between cycles, improves energy production efficiency. Gears, in this embodiment, are an efficient means of transferring wave energy to generators but other mechanisms of transferring rotational energy can be used.

Similar to arrays of offshore wind turbines, electrical processing equipment can take the electrical output of each generator (13), process and combine it at a central electrical processing station, and send it to shore via a single subsea cable, multiple batteries, or other means. In preferred embodiment a central electrical processing station is enclosed within a windowless room and located on a small barge near the center of an array. The windowless room could be climate controlled and dehumidified to better protect the equipment within the electrical processing station.

Components of energy transformation devices that are exposed to the elements, which include floats and torque arms, can be structurally designed for storm and hurricane forces. Offshore oil platforms have similar pontoons and tubulars that are designed for such storms. In a preferred embodiment, if excessively large waves were encountered, smaller gears (5) and (6) could automatically disengage from the bull gear (4). This disengagement feature permits energy transformation devices to simply ride out storms without any damaging effects to internal components.

In rough seas, wave energy transformation devices would have a naturally tendency to collide with one another within their arrays. Note that any point on an individual energy transformation device will move through all six degrees of translation and rotation within a wave cycle. Consequently, there is no single point on an energy transformation device that can be "grabbed" or "held" rigidly in an attempt to interconnect them. To avoid the need for individual mooring systems these devices can be "flexibly" connected yet at the same time be "rigidly" held apart from one another.

In a preferred embodiment, steel posts (16) link energy transformation devices in both transverse and longitudinal directions but have pivoting end connections (17). Pivoting end connections can consist of loose fitting shackles or other similar devices. Stretchable or flexible cords (18) installed in "X" shaped patterns ensure that steel posts (16) stay fairly close to perpendicular with one another. With this unique but important interconnection system the energy transformation devices will naturally return to their original locations upon being excessively displaced by wave motions, currents, winds, or other forces. This system eliminates the need for individual mooring systems and allows hundreds of units to be towed via a single tugboat. Towing of many units is desirable since production-line maintenance onshore is far less expensive than offshore maintenance. This also permits the initial installation of many units to be performed in a single step which greatly reduces overall capital investment costs. Finally, with many units connected together it becomes viable to install thrusters and a global positioning system vs. cables and anchors. If thrusters and a global positioning system are utilized the arrays can self-propel themselves around oncoming hurricanes or typhoons.

What is claimed is:

1. A device for transforming the energy of water waves into useable energy comprising two or more floats, and structural members connecting said floats, whereby motions of said floats relative to one another generates torque, and a means for transferring torque coupled to one or more generators, whereby one or more of said structural members are automatically adjustable in length resulting in improved energy production, and whereby navigational warning equipment is included to alert ships to the location of said energy transformation devices, and whereby a system for interconnecting said energy transformation devices is included which consists of one or more rigid members, one or more elastic or flexible members, and one or more components that permit one or more ends of said rigid members to pivot.

2. The device of claim 1 whereby one or more floats are sufficiently weighted resulting in useful torque during both upward and downward float motions.

3. The device of claim 1 whereby one or more flywheels are included resulting in improved energy production.

4. The device of claim 1 whereby one or more components within the means for transferring torque are capable of freely rotating in one direction resulting in improved energy production.

5. The device of claim 1 whereby one or more components within the means for transferring torque can be disengaged if wave conditions are deemed too onerous.

6. The device of claim 1 whereby a global positioning system is included to maintain one or more of said energy transformation devices at location.

7. A system of devices for transforming the energy of water waves into useable energy comprising two or more floats, and structural members connecting said floats, whereby motions of said floats relative to one another generates torque, and a means for transferring torque coupled to one or more generators, and components for interconnecting said energy transformation devices consisting of one or more rigid members, one or more elastic or flexible members, and one or more components that permit one or more ends of said rigid members to pivot, whereby one or more said structural members are automatically adjustable in length resulting in improved energy production, whereby navigational warning equipment is included to alert ships to the location of one or more said energy transformation devices.

8. The system of claim 7, whereby one or more floats are sufficiently weighted resulting in useful torque during both upward and downward float motions.

9. The system of claim 7, whereby one or more flywheels are included resulting in improved energy production.

10. The system of claim 7, whereby one or more components within a means for transferring torque are capable of freely rotating in one direction resulting in improved energy production.

11. The system of claim 7 whereby one or more parts within the means for transferring torque can be disengaged if wave conditions are deemed too onerous.

* * * * *